United States Patent Office 3,192,169
Patented June 29, 1965

3,192,169
METHOD OF MAKING EXPANDABLE POLYMERIC STYRENE PARTICLES
Kenneth W. Doak, 465 Fairfield Road, Wyckoff, N.J.
No Drawing. Filed Jan. 7, 1965, Ser. No. 424,113
5 Claims. (Cl. 260—2.5)

This invention relates to expandable polymers and, more particularly, to a novel method for the production of expandable styrene polymers by suspension polymerization and impregnation, during such polymerization, of the incompletely polymerized polymer particles with a blowing agent. This application is a continuation-in-part of my copending application Serial No. 142,773, filed October 4, 1961, now abandoned.

Foamed products made from expandable polymers of styrene have a unique combination of properties. Some of the more important of these properties are light weight, high insulating value, buoyancy, and impermeability. This unique combination of properties permits the use of the products in such diverse fields as low-temperature insulation, packaging, refrigeration containers, floatation equipment, and construction.

One of the most widely used processes for making styrene polymers is suspension polymerization. Suspension polymerization, which is described by Boundy and Boyer in their book, Styrene, Its Polymer, Copolymers and Derivatives, Chapter 7, involves the suspension of a polymerizable monomer in water with the aid of a suspension stabilizer which may be organic or inorganic, viz: polyvinyl alcohol, hydroxyethyl cellulose, talc, calcium, phosphate, and the like. In the process, a free radical-producing catalyst is used to air polymerization. The catalyst is decomposed by heat to initiate the reaction.

If a styrene polymer is produced by suspension polymerization, there are two known methods of incorporating the blowing agent to make an expandable polymer. One method involves impregnating the monomer with blowing agent at the time polymerization is initiated. The other method involves combining the completely polymerized polymer with a blowing agent. Methods of the first-described type, i.e., simultaneous impregnation and polymerization of the monomer, are often referred to as pre-impregnation. Methods of the latter type, i.e., complete polymerization followed by impregnation, are commonly referred to as post-impregnation.

The pre-impregnation method is described in U.S. Patent 2,681,321. In that method porous or foamable polystyrene is produced by homogeneously dispersing in styrene an organic volatile non-reactive liquid in which polystyrene is insoluble and polymerizing the resulting mixture at temperatures below the boiling point of the liquid. The polymerization can be carried out in bulk or in suspension. At the completion of polymerization, the resulting mass is foamed by heating at a temperature above the boiling point of the liquid and not more than a few degrees above the softening point of the polystyrene.

The post-impregnation method is described in U.S. Patent 2,983,692. In this method previously produced polymeric particles are impregnated with a normally liquid hydrocarbon blowing agent by forming an aqueous suspension of the particles, preferably in the presence of an anionic surface-active agent, and adding the normally liquid blowing agent, which is maintained in contact with the suspension under elevated temperature and pressure, until the particles are impregnated. The impregnated particles, which may be expanded by the application of heat, are thereafter separated from the suspension.

Both of the foregoing processes have inherent deficiencies. One shortcoming of the pre-impregnation process, as exemplified by U.S. Patent 2,681,321, is that it requires inordinately long polymerization times. These times are so long, up to 28 days, as to preclude significant commercial utility for the process. Another shortcoming of the pre-impregnation process is that the resulting polymer particles are non-uniform and contain blisters and pockmarks, thus limiting their use in many applications.

The post-impregnation process, although it is superior to the pre-impregnation process, is not a complete solution to the practical problem of making high-quality homogeneous particles of expandable polystyrene in a desirably short time. One deficiency of the post-impregnation process is that the total time required to produce finished beads, including the polymerization time of the monomer, is undesirably long. In addition to the time required, the post-impregnation process uses relatively large amounts of suspending agent, which must later be separated from the polymer particles if a uniform foam is to be produced. Also, in order to get rapid and homogeneous penetration of the blowing agent within the polymer particles, additives, such as fatty acids, salts, and toluene, are sometimes used. These additives frequently have an adverse effect on molding which is desirable to avoid. Incomplete penetration results in polymer particles having hard cores or centers. Foamed products, e.g., foamed film, made from hard core particles have many surface imperfections.

I have now discovered that it is possible to obtain improved expandable particles of styrene polymer without any of the foregoing disadvantages of the prior art. This desirable advance in the art is accomplished by polymerizing monomeric styrene in suspension, impregnating, during a late stage of the polymerization period, incompletely polymerized particles of polymers of styrene with a normally liquid blowing agent, and thereafter completing the polymerization.

According to my invention, a styrene monomer is polymerized, using any suspension system, to at least the particle identity point; that is, the point at which the polymer particles have reached their ultimate size, whereupon a normally liquid blowing agent is added and polymerization continued until no more than 0.5% by weight and preferably not more than 0.2% by weight of the monomer remains unconverted.

Any of the known suspending agents are useful in the present invention. From a practical standpoint it is most advantageous to produce beads or particles having a relatively narrow bead size distribution, i.e., beads all having about the same size. Any of the known suspension agents or systems can be so manipulated to control bead size. I have found that the use of hydroxyethyl cellulose is particularly effective. Other systems which I have found to be workable include polyvinyl alcohol and calcium phosphate. Since both inorganic and organic systems are workable, other systems, such as, for example, gum arabic and talc, would provide similar results.

As noted above, the earliest point at which the blowing agent can be added according to the invention is the "particle identity point." This point is recognized in the technical literature as the point at which the beads have grown to their ultimate size. It is known that, in any suspension polymerization which takes place in a turbulent stirred vessel, there is a continual increase in the size of the polymerizing droplets of monomer until such droplets become sufficiently hard or attain sufficient repellency that they do not coalesce. Because of the action of the suspending agent and the intensity of the agitation, the droplets or particles do not thereafter change their size or shape. This "particle identity point" will vary with the suspending system, the degree of agitation, and the shape of the reactor. It has been reported, for instance, by E. H. Mertz in the Journal of Pol. Science, III, No. 9, 374 (1960), that using a polyvinyl alcohol suspension system the particle identity point (PIP) is reached when about 50% of the monomer has been converted to polymer. H. Wenning, Makromolekulare Chemi, 20, 196–213 (1956), reported that this point was reached at about 35% conversion using the suspension system of barium sulfate and sodium octadecylsulfonate. With hydroxyethyl cellulose I have established that this point is reached at between 70 and 75% conversion.

The blowing agent may be added at any time after the particle identity point has been reached. However, the advantages of the invention are not obtained if the polymerization is allowed to reach substantial completion prior to the addition of the blowing agent. This can be avoided by adding the blowing agent prior to the time that the temperature is raised to that of the final polymerization stage, during which the high temperature polymerization initiator undergoes decomposition. At this addition point, approximately 90–95% by weight of monomer has been converted to polymer.

The polymerization initiator is chosen from any of the known styrene-soluble initiator systems, such as are described by Boundy and Boyer aforesaid. I have found that benzoyl peroxide in combination with tertiarybutyl perbenzoate is particularly suitable. Other catalyst systems which may be used are set forth in U.S. Patents 2,656,334; 2,592,251; 2,692,260; and 2,907,756. These catalyst systems comprise a combination of at least one low-temperature peroxidic initiator, i.e., one that decomposes rapidly at temperatures below 100° C., and at least one high-temperature peroxidic initiator, i.e., one that decomposed rapidly at temperatures above 100° C. Polymerization is accomplished in at least two successive heating stages; the initial stage (ca. 90–100° C.), which is catalyzed primarily by the low-temperature initiator, and successive stages (ca. 100–150° C.), which are catalyzed primarily by the high-temperature initiator.

The specific amounts of the various components of the polymerization reaction will vary with the particular reactants used but will be easily determined by the worker in the art.

The rate of polymerization is dependent both upon the polymerization catalyst used and the time-temperature polymerization schedule or cycle. The particular polymerization cycle used is a matter of choice and dependent upon the catalyst system. Although the specific time-temperature relationship will not have any great effect on the process of the invention, a faster cycle is obviously to be preferred over a slower cycle because of the increased production possible therewith. The exact temperatures and pressures used will depend largely on the equipment available. Pressures of more than 150 p.s.i.g. and temperature of as high as about 150° C. can be used, although it is preferable to use the less drastic conditions shown in the examples that follow.

In addition to polystyrene, styrene copolymers, such as copolymers of styrene and isoprene or styrene and alphamethylstyrene, may be used in the process of the invention.

The ratio of organic phase (i.e., styrene plus blowing agent) to water which is used should be, from a practical point, as high as possible. I have found that it is possible to polymerize at a ratio slightly greater than a 1:1 ratio of organic phase to water; i.e., 100 parts by weight of styrene, 9.5 parts by weight of pentane, and 108 parts by weight of water. The lower limit is, from a practical viewpoint, of little importance, because of the commercially desirable goal of obtaining the greatest possible amount of product per polymerization.

The pentane-to-styrene weight ratio may be increased above that noted above, if the concentration of water is increased or if the total charge in the reactor is decreased. However, the above formulation is sufficient to yield beads having, upon completion of polymerization, a pentane content of about 5.5–8.5% by weight. In addition to n-pentane, other normally liquid hydrocarbon blowing agents may be used, such as hexane, petroleum ether, mixtures of pentane isomers, e.g., equal weight parts of isopentane and n-pentane, and mixed hydrocarbons designated as the hexane cut, boiling in the range of 30–110° C., which contains $C_5$, $C_6$, and $C_7$ hydrocarbons.

The following examples more fully illustrate the practice of the invention. In the examples the term "parts" refers to parts by weight.

*Example I*

To a one-hundred gallon reactor there was added in the following order while stirring, 100 parts of styrene, a catalyst consisting essentially of 0.23 parts of benzoyl peroxide and 0.10 parts of t-butyl perbenzoate, 108 parts of water, 0.05 tetrasodium pyrophosphate, a suspension aid, and 0.15 parts of hydroxyethyl cellulose, a suspending agent. The reactor was heated to 92° C. over 1.5 hours and held at this temperature for 8 hours, during which time the benzoyl peroxide serves as the primary initiator. At the end of the first 5 hours at 92° C. (about 70–75% conversion), by which time the particle identity point had been reached, an additional 0.05 parts of hydroxyethyl cellulose was added and the addition of 9.5 parts of normal pentane commenced. The pentane addition took 1.5 hours. At the completion of the 8 hour period (about 92% conversion), the temperature was raised to 115° C. over one hour, then maintained at this temperature for 4 hours to complete the polymerization, with the t-butyl perbenzoate serving as the principal initiator. The pressure in the polymerization reactor at 92° C. was 63–68 p.s.i.g. and at 115° C. was 79–83 p.s.i.g.

The resulting beads were separated, washed, and dried. Analysis showed that the beads contained 0.2% by weight residual monomer, 0.32% by weight water, and had a pentane content of 6.2% by weight.

The size of the beads was determined by screen analysis (U.S. Sieves) and was as follows:

| | Percent |
|---|---|
| On number ten sieve | 1.0 |
| On number 16 sieve | 16.3 |
| On number 20 sieve | 74.8 |
| On number 30 sieve | 7.4 |
| On number 40 sieve | 0.5 |
| Through number 40 sieve | 0.0 |

The above illustrates the production of commercially usable products by the process of the invention; a bead size primarily in the range of 0.42–2.0 millimeters and a blowing agent content of about 6%.

*Example II*

To show the effect of an early addition of the blowing agent to the polymerization, i.e., pre-impregnation, Example I was repeated on a smaller scale with the exception that the pentane was added to the styrene prior to the addition of the water thereto and before any polymerization occurred. The same heating schedule was followed. The beads produced were analyzed and were found to have a residual monomer content of one percent by weight, a water content of 3.4% by weight, and a pentane content of 4.3% by weight. This example shows the criticalness of the time of the addition of the pentane to the polymerization system. The "pre-impregnated" beads are obviously inferior because of the high residual monomer content, which causes shrinkage or collapse of the foam during or after the subsequent molding process.

This procedure was again repeated with the exception that the polymerization at 115° C. was conducted for ten hours to lower the monomer content to a useful level. The residual monomer content of the beads was determined and found to be 0.4% by weight. This increase in polymerization time over that required in Example I indicates that the pentane addition must be made at a time subsequent to the particle identity point if the advantages of the invention are to be obtained. Otherwise, the polymerization time required precludes commercial utility.

Example III

Styrene (100 parts) was added to a nitrogen-purged 100-gallon reactor. With stirring, the catalysts, benzoyl peroxide (0.23 part) and t-butyl perbenzoate (0.10 part), were added to the reactor. Deionized water (108 parts) was added without stirring; this was followed by the addition of 0.05 part tetrasodium pyrophosphate and 0.15 part hydroxyethyl cellulose with stirring. The recator was heated to 92° C. over 80 minutes and held at this temperature for 487 minutes. After 290 minutes at 92° C. (about 77% conversion of monomer to polymer), an additional 0.05 part hydroxyethyl cellulose was added and at 307 minutes at 92° C., 9.5 parts of normal pentane was added to the reactor over a 90-minute period. The reactor temperature was next increased to 115° C. over 60 minutes (about 95% conversion) and held there for 240 minutes to complete polymerization and impregnation. The reactor pressure during the 92° C. period was 55–61 p.s.i.g. and during the 115° C. period it was 87–92 p.s.i.g.

The resulting beads were centrifuged, washed, and dried, and had the following product analysis: 0.3% by weight residual styrene monomer, 8.3% by weight hydrocarbon content, and 0.5% by weight internal moisture (water).

The bead size distribution (U.S. Sieves) was:

| | Percent |
|---|---|
| On number ten sieve | 0.4 |
| On number 16 sieve | 53.7 |
| On number 20 sieve | 41.8 |
| On number 30 sieve | 3.5 |
| On number 40 sieve | 0.4 |
| Through number 40 sieve | 0.2 |

The amount of usable commercial product was 99%.

Pre-expanded particles having a density of about one pound per cubic foot were made from the beads. Examination of the pre-expanded material showed no hard cores in any of the particles.

Example IV

The following experiment was made according to the procedure of Example I of D'Alelio, U.S. Patent 2,983,692.

A nitrogen purge was turned on to a 100-gallon stirred reactor. Deionized water (354 parts) was added to the reactor; then 3.72 parts tricalcium phosphate was added with stirring. Without stirring, 428 parts styrene, 0.868 part benzoyl peroxide, and 0.189 part t-butyl perbenzoate were added. The stirrer was turned on and 0.0164 part Nacconol sodium dodecylbenzene sulfonate was added. The reactor was heated to 90° C. over 72 minutes and held at that temperature for 330 minutes. The reactor temperature was next increased to 115° C. over 43 minutes and held for 180 minutes. After reducing the temperature of 90° C. (99.8% conversion of monomer to polymer), 47.6 parts petroleum ether was added over a 50-minute period; the hard bead impregnation was for 240 minutes at a reactor temperature of 90° C. and a reactor pressure of 46–60 p.s.i.g.

The product slurry was cooled and the beads were separated by centrifugation. Reslurring of the beads was followed by the addition of HCl to dissolve the residual tricalcium phosphate. The beads were recentrifuged and then dried until free-flowing and were analyzed to contain 0.1% by weight residual sytrene monomer, 7.8% by weight hydrocarbon content, and 0.01% by weight internal moisture (water). The bead size distribution (U.S. Sieves) was:

| | Percent |
|---|---|
| On number ten sieve | 1.0 |
| On number 16 sieve | 1.4 |
| On number 20 sieve | 2.4 |
| On number 30 sieve | 26.5 |
| On number 40 sieve | 47.2 |
| Through No. 40 sieve | 21.5 |

The amount of usuable commercial product was only 77.5%.

Pre-expanded particles made from the beads were found to have hard cores. When the particles were extruded into blown film, the hard cores appeared as imperfections in the film.

A comparison of the results of this example with those of Example III dramatically show the advantages of the method of the present invention over a post-impregnation process. The present invention provides a more homogeneous product in substantially greater yields.

Example V

To a one-hundred gallon reactor there was added in the following order while stirring, 100 parts of styrene, a catalyst consisting essentially of 0.20 parts of benzoyl peroxide and 0.075 part of t-butyl perbenzoate, 0.4 part of dicumyl peroxide, a self-extinguishing synergistic agent, 3.0 parts of tris (2,3-dibromopropylphosphate), a fire retarding agent, 108 parts of water, and 0.1035 part of hydroxyethyl cellulose, a suspending agent. The reactor was heated to 90° C. over 1.5 hours and held at this temperature for 6.5 hours, during which time the benzoyl peroxide served as the primary initiator and the beads reached the particle identity point. At the end of 6.5 hours at 90° C. (about 70% conversion), an additional 0.135 part of hydroxyethyl cellulose as a 2.5% aqueous solution was added to prevent the beads from agglomerating and the addition of a mixture of 3.75 parts of normal pentane and 3.75 parts of isopentane was commenced. The pentane addition took 1.5 hours and polymerization was continued for another 1.5 hour period (about 95% conversion). The temperature was then raised to 115° C. over one hour, then maintained at this temperature for 4 hours to complete the polymerization, during which time the t-butyl perbenzoate served as the principal initiator. The pressure in the polymerization reactor at 90° C. was 65–70 p.s.i.g. and at 115° C. was 81–82 p.s.i.g.

The resulting beads were separated, washed, and dried. Analysis showed that the beads had a pentane content of 6.2% by weight. The size of the beads was determined by screen analysis (U.S. Sieves) and was as follows:

| | Percent |
|---|---|
| On number ten sieve | 1.9 |
| On number 16 sieve | 56.9 |
| On number 20 sieve | 38.1 |
| On number 30 sieve | 2.9 |
| On number 40 sieve | 1.2 |
| Through number 40 sieve | 0.4 |

The above illustrates the production of a fire retardant product by the process of the invention. The molding properties of the beads, after pre-expansion to a density of about one pound per cubic foot, were good.

Example VI

To a one hundred-gallon reactor there was added in the following order while stirring, 100 parts of styrene, a catalyst consisting essentially of 0.20 part of benzoyl peroxide and 0.075 part of t-butyl perbenzoate, 1.1 parts of wax (Sunoco 4412), a molding aid, 108 parts of water, and 0.14 part of hydroxyethyl cellulose, a suspending agent. The reactor was heated to 90° C. over 1.0 hour and held at this temperature for 6.5 hours (about 70% conversion of monomer to polymer), during which time the benzoyl peroxide served as the primary initiator and the beads had reached the particle identity point. At the end of 6.5 hours at 90° C., an additional 0.11 part of hydroxyethyl cellulose was added and the addition of 8.5 parts of isopentane commenced. The pentane addition took 1.5 hours and polymerization was continued for an additional 0.6 hour. At the completion of the 8.6 hour period (about 94% conversion), the temperature was raised to 115° C. over one hour, then maintained at this temperature for 4 hours to substantially complete the polymerization, during which time the t-butyl perbenzoate served as the principal initiator. The pressure in the polymerization reactor at 90° C. was 65–74 p.s.i.g. and at 115° C. was 70–78 p.s.i.g.

The resulting beads were separated, washed, and dried. Analysis showed that the beads contained less than 0.1% by weight water and had an isopentane content of 6.2% by weight. The size of the beads was determined by screen analysis (U.S. Sieves) and was as follows:

| | Percent |
|---|---|
| On number ten sieve | 2.1 |
| On number 16 sieve | 45.1 |
| On number 20 sieve | 41.3 |
| On number 30 sieve | 6.3 |
| On number 40 sieve | 3.7 |
| Through number 40 sieve | 1.2 |

The foregoing examples have shown a novel commercial process for the production of expandable polystyrene. This process has demonstrable advantages over the processes heretofore used and results in a larger production rate per reactor and in a higher quality material than that heretofore available.

I claim:
1. A method of making expandable polymeric styrene particles comprising polymerizing a styrene monomer in aqueous suspension by heating said monomer in the presence of a catalyst, consisting essentially of at least one low temperature peroxidic initiator and at least one high temperature peroxidic initiator, to a temperature at which said low temperature initiator serves as the principal initiator, continuing polymerization at least until the particle identity point is reached, thereafter adding a normally liquid hydrocarbon blowing agent, raising the temperature to that at which said high temperature initiator serves as the principal initiator, and continuing heating until polymerization is substantially complete as evidenced by the presence of less than 0.5% by weight residual monomer in the polymer particles.

2. A method of making expandable polymeric styrene particles comprising polymerizing a styrene monomer suspended in water with the aid of a suspending agent by heating said monomer in the presence of a catalyst, consisting essentially of at least one low temperature peroxidic initiator and at least one high temperature peroxidic initiator, to a temperature at which said low temperature initiator serves as the principal initiator, continuing polymerization at least until the particle identity point is reached, thereafter adding a normally liquid hydrocarbon blowing agent boiling in the range of 30–100° C., raising the temperature to that at which said high temperature initiator serves as the principal initiator, continuing heating until polymerization is substantially complete as evidenced by the presence of less than 0.5% by weight residual monomer in the polymer particles, and recovering polymeric styrene particles having said blowing agent homogeneously incorporated therein.

3. A method of making expandable polystyrene particles comprising polymerizing styrene monomer suspended in water with the aid of hydroxyethyl cellulose by heating said monomer in the presence of a catalyst, consisting essentially of benzoyl peroxide and t-butyl perbenzoate, to a temperature at which said benzoyl peroxide serves as the principal initiator, continuing polymerization at least until the particle identity point is reached, thereafter adding pentane blowing agent and additional hydroxyethyl cellulose, raising the temperature to that at which said t-butyl perbenzoate serves as the principal initiator, continuing heating until polymerization is substantially complete as evidenced by the presence of less than 0.5% by weight residual monomer in the polymer particles, and recovering expandable polystyrene particles having pentane homogeneously incorporated therein.

4. A method of making expandable polymeric styrene particles comprising polymerizing a styrene monomer in aqueous suspension by heating said monomer in the presence of a free-radical catalyst initiator until at least about 70% by weight of said monomer has been converted to polymer in the form of discrete particles, thereafter adding a normally liquid hydrocarbon blowing agent before about 95% by weight of said monomer has been converted to polymer, and continuing heating until polymerization is substantially complete as evidenced by the presence of less than 0.5% by weight residual monomer in the polymer particles.

5. A method of making expandable polystyrene particles comprising polymerizing styrene suspended in water with the aid of a suspending agent by heating said styrene in the presence of a peroxidic catalyst initiator until at least about 70% by weight of said styrene has been converted to polystyrene in the form of discrete particles, thereafter adding pentane blowing agent before about 95% by weight of said styrene has been converted to polystyrene, continuing heating until polymerization is substantially complete as evidenced by the presence of less than 0.5% by weight residual monomer in the polystyrene particles, and recovering expandable polystyrene particles having pentane homogeneously incorporated therein.

References Cited by the Examiner

UNITED STATES PATENTS

| | | | |
|---|---|---|---|
| 2,848,428 | 8/58 | Rubens | 260—2.5 |
| 2,875,186 | 2/59 | Gerhard et al. | 260—17 |
| 2,983,692 | 5/61 | D'Alelio | 260—2.5 |
| 3,027,336 | 3/62 | Gotz et al. | 260—2.5 |
| 3,054,146 | 9/62 | Griffen | 260—2.5 |

OTHER REFERENCES

Hohenstein et al.: Journal of Polymer Science, vol. 1, 1946, pages 127–144.

MURRAY TILLMAN, *Primary Examiner.*